(12) United States Patent
Sekihara et al.

(10) Patent No.: US 6,779,990 B2
(45) Date of Patent: Aug. 24, 2004

(54) BEARING MECHANISM AND A PUMP (75) Inventors: Yasuhito Sekihara, Kariya (JP); Akinori Okuya, Chiryu (JP); Satosi Kaminaka, Kariya (JP); Akihiro Yokoyama, Chiryu (JP)

(73) Assignees: Aisin Seiki Kabushiki Kaisha, Kariya (JP); Advics Co., Ltd., Kariya (JP)

( * ) Notice: Subject to any disclaimer, the term of this patent is extended or adjusted under 35 U.S.C. 154(b) by 38 days.

(21) Appl. No.: 10/076,427

(22) Filed: Feb. 19, 2002

(65) Prior Publication Data

US 2002/0119057 A1 Aug. 29, 2002

(30) Foreign Application Priority Data

Feb. 20, 2001 (JP) ........................................ 2001-043417
Feb. 18, 2002 (JP) ........................................ 2002-040256

(51) Int. Cl.$^7$ ............................................... F04B 17/00
(52) U.S. Cl. ........................ 417/415; 417/273; 417/415
(58) Field of Search ............................. 417/273, 410.1, 417/415, 521; 92/129; 384/517, 518, 563, 445, 490, 548, 590, 618

(56) References Cited

U.S. PATENT DOCUMENTS

| | | | | |
|---|---|---|---|---|
| 2,504,776 A | * | 4/1950 | Woodfield et al. | ........... 384/535 |
| 3,009,748 A | * | 11/1961 | Pitner | ........................ 384/581 |
| 3,067,728 A | * | 12/1962 | Bordini | ........................ 91/492 |
| 3,786,289 A | * | 1/1974 | Baclawski et al. | ............ 310/90 |
| 4,223,962 A | | 9/1980 | Zielfleisch | |
| 4,279,451 A | * | 7/1981 | Heldt | .......................... 308/26 |
| 4,313,714 A | | 2/1982 | Kubeczka | |
| 5,895,207 A | * | 4/1999 | Burgdorf et al. | ......... 417/410.1 |
| 5,899,574 A | | 5/1999 | Chujo | |
| 5,932,945 A | * | 8/1999 | Volz et al. | .................... 310/89 |
| 6,190,052 B1 | | 2/2001 | Schnur et al. | |
| 6,196,812 B1 | | 3/2001 | Siegel | |
| 6,489,699 B2 | * | 12/2002 | Hioki et al. | ................. 310/90 |

FOREIGN PATENT DOCUMENTS

| | | |
|---|---|---|
| DE | 22 92 59 | 5/1909 |
| DE | 79 18 879 U1 | 12/1980 |
| DE | 29 27 187 A1 | 1/1981 |
| DE | 000303147 A1 * | 8/1988 |
| DE | 000303148 A1 * | 2/1989 |
| DE | 196 03 121 A1 | 8/1996 |
| DE | 196 50 276 A1 | 6/1998 |
| DE | 198 13 301 A1 | 9/1999 |
| DE | 198 26 172 A1 | 12/1999 |
| JP | 62-098024 A | 5/1987 |
| JP | 362098024 A * | 5/1987 |
| JP | 02000175402 A * | 6/2000 |
| JP | 2002-503308 A | 1/2002 |

\* cited by examiner

*Primary Examiner*—Justine R. Yu
*Assistant Examiner*—John F Belena
(74) *Attorney, Agent, or Firm*—Burns, Doane, Swecker & Mathis, L.L.P.

(57) ABSTRACT

A bearing mechanism comprises a shaft rotatably supported by a bearing accommodated in a cylindrical bearing accommodating portion. The shaft is applied with varying load in response to a slidable movement of a pair of pistons so as to be displaced in a direction. The bearing is displaced corresponding to the displacement of the shaft being applied with the varying load. The bearing mechanism further comprises a biasing means. The biasing means biases the bearing to be always in contact with at least a portion of an inner peripheral surface of the cylindrical bearing accommodating portion in the other direction different from the direction in which the bearing is displaced in accordance with the varying load.

10 Claims, 8 Drawing Sheets

BEARING MECHANISM AND A PUMP

CROSS REFERENCE TO RELATED APPLICATIONS

This application is based on and claims priority under 35 U.S.C. §119 with respect to a Japanese Patent Application 2001-43417, filed on Feb. 20, 2001 and a Japanese Patent Application 2002-40256, filed on Feb. 18, 2002, the entire content of which is incorporated herein by reference.

FIELD OF THE INVENTION

This invention generally relates to a bearing mechanism and a pump provided with the bearing mechanism. More particularly, this invention pertains to a bearing mechanism and a pump provided with the bearing mechanism for rotatably supporting a shaft applied with varying load.

BACKGROUND OF THE INVENTION

Various electric motor-pumps have been already well known. An electric motor pump provided with a pair of pump pistons is disclosed as an example of the electric motor-pumps in a publication as a U.S. Pat. No. 5,895,207 (corresponding to a Japanese Patent No. 3078578). The pair of pump pistons is arranged opposite each other around a pump eccentric of a rotor shaft. The pair of pump pistons is slidably moved in accordance with a rotatable movement of the rotor shaft, whereby a volume of each fluid chamber defined by each piston is varied. Fluid is hence introduced into each fluid chamber or discharged therefrom.

The rotor shaft of the electric motor pump disclosed in the above publication operates the pair of pump pistons when the rotor shaft is rotated. The rotor shaft is hence applied with reactive load from the pair of pump pistons alternately. Therefore, a bearing supporting the rotor shaft is applied with the load as well.

In general, when even slight clearance is defined between a pump housing supporting the bearing and the bearing, the bearing may be displaced by the clearance in a direction of the load applied to the bearing and may collide with the pump housing. Especially, when the load is applied to the bearing alternately from opposite sides as disclosed in the above publication, the bearing may repeatedly collide with the pump housing. Accordingly, noise or vibration may occur due to the repeated collisions of the bearing with the pump housing.

In order to overcome the above described drawbacks, some methods have been conventionally utilized to clear the clearance between the bearing and the pump housing. For example, the clearance between the bearing and the pump housing can be sealed by pouring resin therein or by applying force from an outer periphery of the bearing or the housing toward the clearance for example by press-caulking or press-fitting.

However, according to the former method of pouring resin in the clearance, a manufacturing process for pouring resin and for hardening the resin is additionally required. Further, when the bearing is positioned at a central portion of the housing, a pouring circuit for pouring the resin to the bearing from an outside portion of the housing is additionally required. According to the latter method of applying force from the outer periphery of the bearing or the housing toward the clearance, the bearing may be deformed due to being applied with the undesirable force. Therefore, the bearing may not be rotated smoothly and unreasonable force may be applied to the rotor shaft. To overcome these drawbacks, the press-caulking or the press-fitting may be required to be accurately implemented for clearing the clearance and not for deforming the bearing. Further, this may require difficult assembling conditions and may cause low yield ratio. Therefore, manufacturing cost upon both methods may be increased to prevent noise or vibration.

Accordingly, known bearing mechanisms and electric motor-pumps are still susceptible of certain improvements with respect to supplying a bearing mechanism and the electric motor-pump which can restrain noise or vibration due to the collisions of the bearing with the pump housing at a low cost.

SUMMARY OF THE INVENTION

A bearing mechanism comprises a shaft applied with varying load, a bearing accommodated in a cylindrical bearing accommodating portion for supporting the shaft, and a biasing means. The biasing means is employed for biasing the bearing to be always in contact with at least a portion of an inner peripheral surface of the cylindrical bearing accommodating portion in a first direction different from a second direction in which the bearing is displaced in accordance with the varying load.

Further, according to another aspect of the present invention, a pump provided with a bearing mechanism comprises a rotor shaft pushed by a pair of pistons so as to displace the bearing supporting the rotor shaft. The bearing is biased by the biasing force of the biasing means in a radial direction to be always in contact with any one of portions of the cylindrical bearing accommodating portion so as to be displaced.

Further, according to another aspect of the present invention, a pump provided with a bearing mechanism comprises a bearing being inclined within the range of the clearance between the bearing and the cylindrical bearing accommodating portion due to the biasing force of the biasing means in the axial direction. That is, the bearing is accommodated in the cylindrical bearing accommodating portion having an axial direction being inclined relative to an axial direction of the cylindrical bearing accommodating portion.

BRIEF DESCRIPTION OF THE DRAWING FIGURES

The foregoing and additional features and characteristics of the present invention will become more apparent from the following detailed description considered with reference to the accompanying drawing figures wherein.

DETAILED DESCRIPTION OF THE INVENTION

Figure 2:
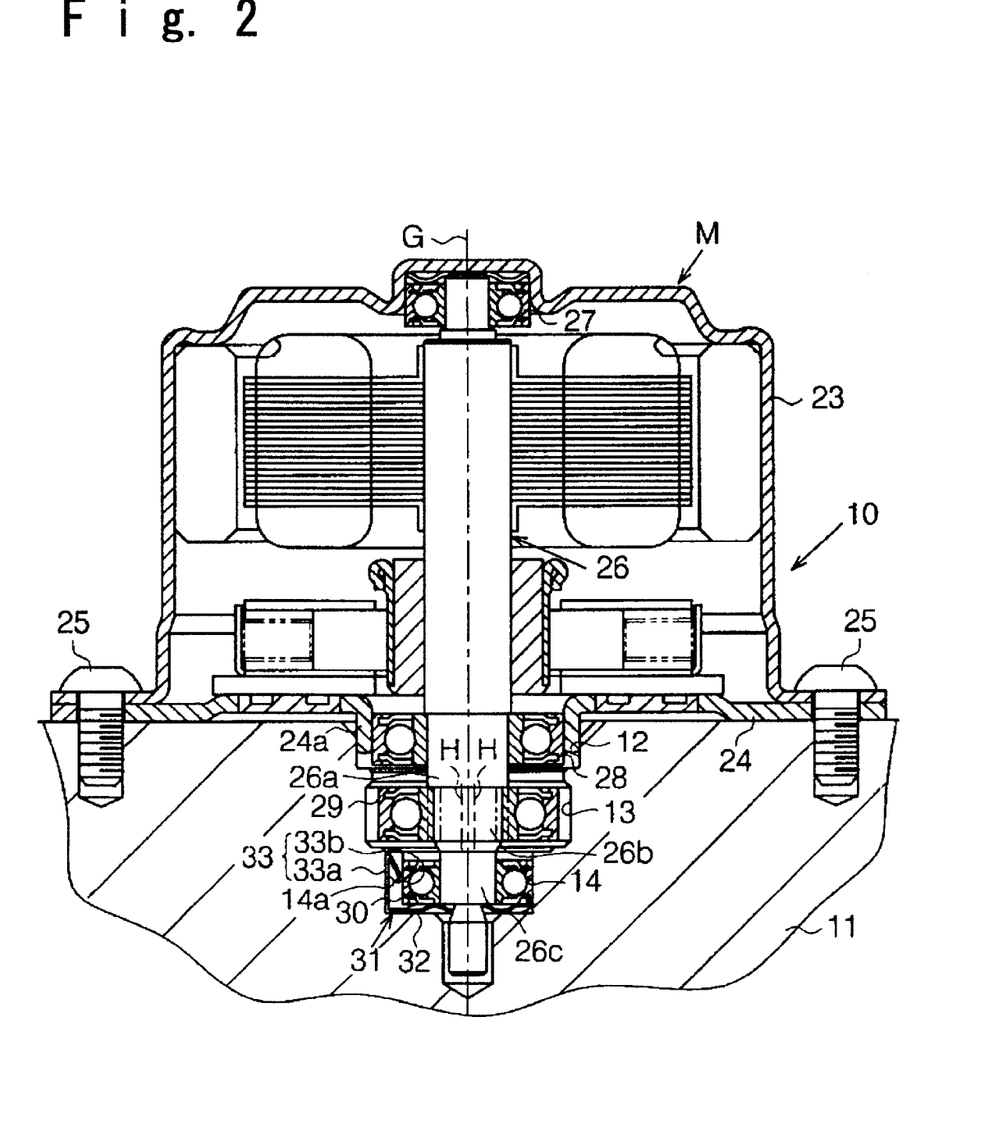
FIG. 2 is a cross-sectional view of the pump along a line 2—2 in FIG. 1.

Referring to FIG. 2, a pump 10 is operated by a DC motor M as an electric motor fixedly connected to a pump main body 11. The pump main body 11 is provided with a first bearing bore 12 with a bottom portion at one end. An accommodating bore 13 with a bottom portion at one end is provided at the bottom portion of the first bearing bore 12. A second bearing bore 14 with a bottom portion at one end (a cylindrical bearing accommodating portion) is provided at the bottom portion of the accommodating bore 13. Each diameter of the first bearing bore 12, the accommodating bore 13, and the second bearing bore 14 becomes smaller in this order.

Figure 1:
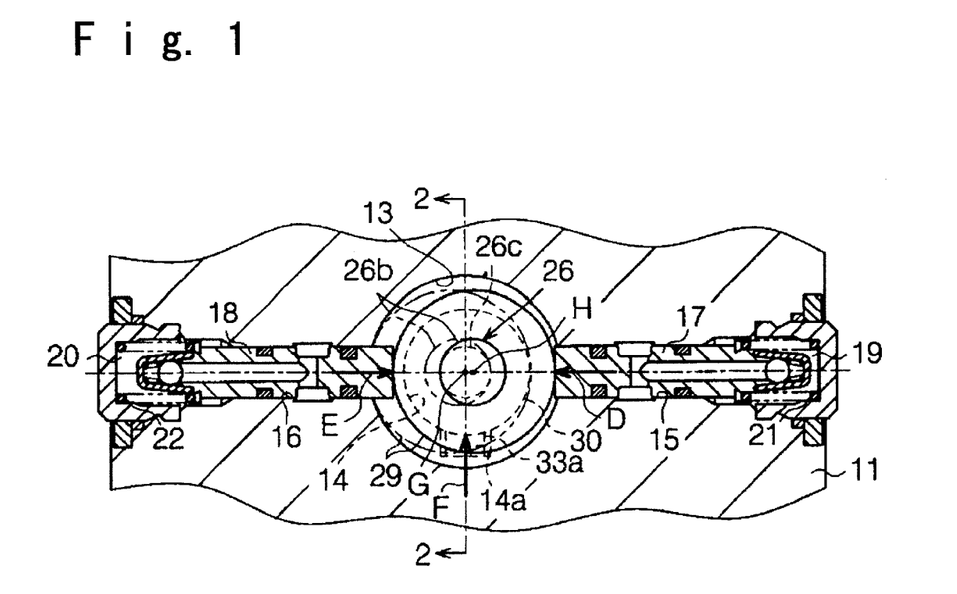
FIG. 1 is a plan cross-sectional view illustrating a relevant portion of a pump according to a first embodiment.

As illustrated in FIG. 1, a first piston accommodating bore 15 and a second piston accommodating bore 16 are defined at relative portions of an inner peripheral wall of the accommodating bore 13 and extend outwardly in right and left directions (in FIG. 1) opposing each other. The first and second piston accommodating bores 15 and 16 respectively intersect at right angles with the paper according to FIG. 2 that they are not illustrated in FIG. 2. A first piston 17 is slidably accommodated in the first piston accommodating bore 15 and a second piston 18 is slidably accommodated in the second piston accommodating bore 16. A fluid chamber 19 is defined by the first piston 17 behind thereof (in the right side in FIG. 1) and a fluid chamber 20 is defined by the second piston 18 behind thereof (in the left side in FIG. 1). A return spring 21 is disposed in the fluid chamber 19 and a return spring 22 is disposed in the fluid chamber 20. Therefore, the first piston 17 is always applied with a biasing force of the return spring 21 in a direction D, i.e. towards a shaft center of the accommodating bore 13 and the second piston 18 is applied with a biasing force of the return spring 22 in a direction E, i.e. towards the shaft center of the accommodating bore 13.

A groove 14a is axially defined in an inner peripheral wall of the second bearing bore 14. More specifically, the axially defined groove 14a intersects at right angles with shaft centers of the first and second piston accommodating bores 15, 16. The groove 14a is illustrated at the left side in FIG. 2.

The DC motor M includes a motor housing 23 formed of a motor case and an end frame 24 so that the DC motor M is connected to the pump main body 11 by fixedly connecting the motor housing 23 and the end frame 24 with the pump main body 11 by means of bolts 25. An upper portion of a rotor shaft 26 of the DC motor M is rotatably supported by a bearing 27 supported by the motor housing 23. A bottom portion of the rotor shaft 26 is projected out of the end frame 24 and extends to the second bearing bore 14 via the first bearing bore 12 and the accommodating bore 13.

The bottom portion of the rotor shaft 26 is provided with a middle diameter portion 26a at a position of the first bearing bore 12, with an eccentric portion 26b at a position of the accommodating bore 13, and with a small diameter portion 26c at a position of the second bearing bore 14. The middle diameter portion 26a is coaxial with a shaft center G of the rotor shaft 26 and is rotatably supported by a bearing 28 disposed in the first bearing bore 12. A central portion of the end flame 24 is bent toward the pump main body 11 so as to define a fixed cylinder 24a. Therefore, the bearing 28 is fixed to the pump main body 11 by disposing the fixed cylinder 24a between an outer race of the bearing 28 and an inner peripheral wall of the first bearing bore 12. The eccentric portion 26b has a shaft center H different from the shaft center G of the rotor shaft 26 so as to be rotated in an eccentric manner in response to the rotation of the rotor shaft 26. A bearing 29 fixed to the eccentric shaft 26b is hence rotated in the eccentric manner with the eccentric shaft 26b. As illustrated in FIG. 1, the first and second pistons 17 and 18 are slidabily pushed to an outer race of the bearing 29 by the biasing force of the return springs 21 and 22, respectively. Therefore, each first and second piston 17 and 18 performs a reciprocating movement in right and left directions (in FIG. 1) against the biasing force of each return spring 21 and 22 in accordance with the eccentric movement of the bearing 29. That is, each first and second piston 17 and 18 performs a piston movement. The small diameter portion 26c is coaxial with the shaft center G of the rotor shaft 26 and is rotatably supported by a bearing 30 disposed in the second bearing bore 14. A bottom surface of an outer race of the bearing 30 is supported by a wave washer 31 disposed at the bottom portion of the second bearing bore 14.

Figure 3:
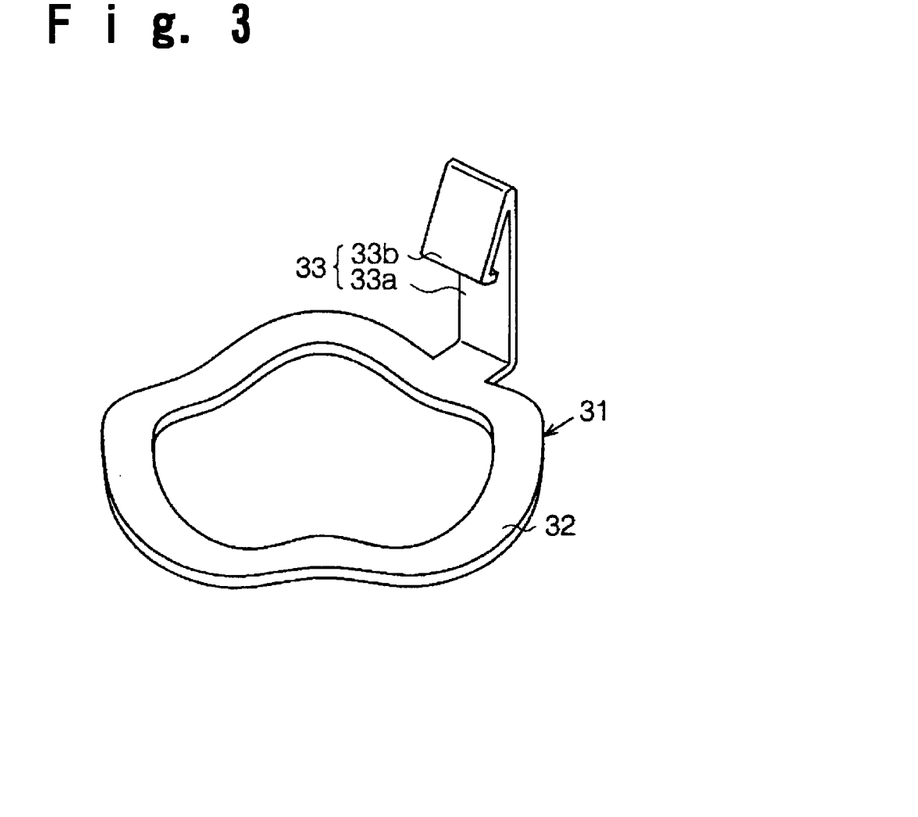
FIG. 3 is a perspective view illustrating a wave washer according to the first embodiment.

As illustrated in FIG. 3, the wave washer 31 includes a plate portion 32 (position determining means) in a ring shaped structure with a wavy cross-section. The plate portion 32 of the wave washer 31 supports a force in a thrust direction applied to the bearing 30 and determines an axial position of the bearing 30 and the shaft 26. A spring member 33 (biasing means) extends at a portion of an outer periphery of the plate portion 32. The spring member 33 is comprised of a base plate 33a and an elastic piece 33b of which front end portion is bent toward the base plate 33a. The base plate 33a is inserted into the groove 14a when the wave washer 31 is disposed at the bottom portion of the second bearing bore 14. The elastic piece 33b is disposed between the outer race of the bearing 30 and the inner peripheral wall of the second bearing bore 14 when the bearing 30 is disposed in the second bearing bore 14. Therefore, the bearing 30 is supported in a state where the bearing 30 has been pushed to the inner peripheral wall of the second bearing bore 14 at an opposite side to the spring member 33. According to a first embodiment of the present invention, the spring member 33 is inserted into the groove 14a intersected at right angles with the shaft center of the first and second piston accommodating bores 15 and 16. Therefore, the bearing 30 is applied with an elastic force of the elastic piece 33b in a direction intersected at right angles with the shaft center of the first and second piston accommodating bores 15 and 16.

When the pump 10 with the above described structure is assembled, the rotational shaft 26 provided with the bearings 28, 29, 30 and the wave washer 31 is first disposed in the first bearing bore 12, the accommodating bore 13, and the second bearing bore 14. In this case, the base plate 33a is fitted into the grove 14a. The motor housing 23 and the end flame 24 are then fixed to the pump body 11 by means of the bolt 25. The first and second pistons 17, 18 are arranged in the first and second piston accommodating bores 15, 16.

Figure 4:
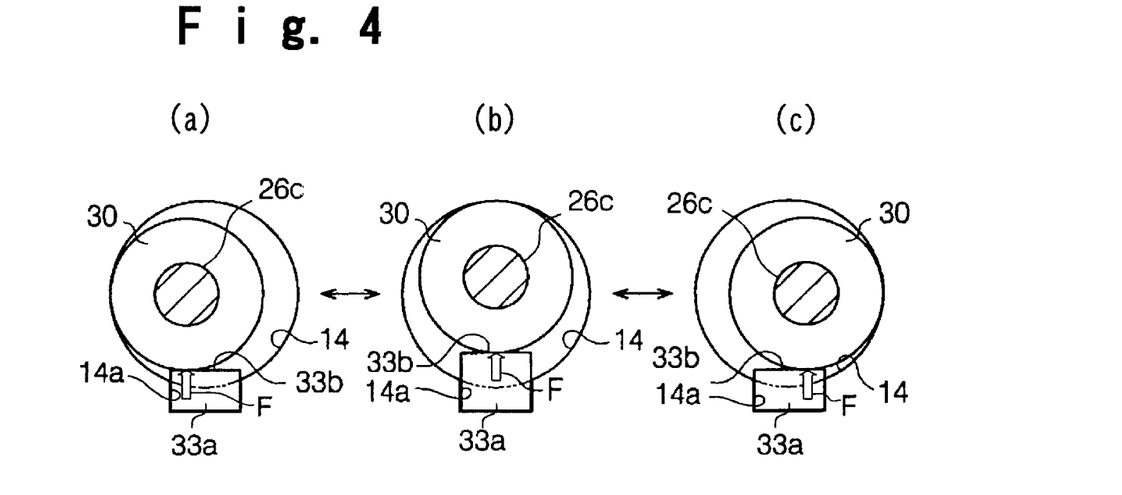
FIG. 4 illustrates an operation principle of a pump according to the first embodiment.

Next, an operation of the pump 10 with the above described structure is described with reference to FIG. 4. A clearance is defined between the bearing 30 and the second bearing bore 14. Although the clearance is very small, such as several $\mu$m, the clearance is enlarged in FIG. 4 to make the description clearer.

When the pump 10 is under a non-activated condition, the bearing 30 is applied with a biasing force (the elastic force) of the elastic piece 33b of the spring member 33. The biasing force of the elastic piece 33b is applied to the bearing 30 in a direction F (in an upper direction in FIG. 4) as illustrated in FIG. 4(b). The direction F intersects at right angles with the directions of the first and second pistons 17 and 18 acting on the rotor shaft 26, i.e. intersects at right angles with the directions D and E so as to displace the bearing 30.

On the other hand, when the pump 10 is activated, the rotor shaft 26 is rotated. The eccentric shaft 26b and the bearing 29 supported thereby are rotated in the eccentric manner with a center on the shaft center G of the rotor shaft 26 in response to the rotation of the rotor shaft 26. The first and second pistons 17 and 18 are hence slidably moved in the first and second piston accommodating bores 15 and 16 respectively corresponding to the eccentric movement of the bearing 29. Therefore, the respective volumes of the fluid chambers 19 and 20 are varied.

The first piston 17 is moved in a direction of the fluid chamber 19 and the second piston 18 is moved in a direction of the shaft center G of the rotor shaft 26 in a state where the eccentric portion 26b is positioned at a rightmost side as illustrated by a solid line in FIG. 1. The volume of the fluid chamber 19 is hence decreased and the volume of the fluid chamber 20 is hence increased. Therefore, hydraulic pressure in the fluid chamber 19 becomes larger than the one in the fluid chamber 20. A pressure difference between the hydraulic pressure in the fluid chamber 19 and the one in the fluid chamber 20 is applied to the eccentric portion 26b from the first piston 17. That is, the rotor shaft 26 is deflected being applied with a load in the direction D from the first piston 17. The rotor shaft 26 is rotatably supported at an upper end by means of the bearing 27 and at a lower end by means of the bearing 30. The load acts on the eccentric portion 26b which is disposed more close to the upper end than the small diameter portion 26c. Therefore, when the rotor shaft 26 is applied with the load, the small diameter potion 26c and the bearing 30 are moved in the same direction to the direction D in which the rotor shaft 26 is applied with the load, i.e. are moved toward the second piston 18 which is not illustrated in FIG. 4 so as to be positioned as illustrated in FIG. 4(a). In this case, the bearing 30 is hence pushed by the biasing force of the spring member 33 in the direction F intersected at right angles with the direction D in which the bearing 30 is moved. The bearing 30 is hence rotatably moved in contact with the inner periphery of the second bearing bore 14 while rotating around the small diameter portion 26c so as to be moved from a position illustrated in FIG. 4(b) to another position illustrated in FIG. 4(a).

The hydraulic pressure in the fluid chamber 19 is decreased and the hydraulic pressure in the fluid chamber 20 is increased in response to the slidable movement of the first and second pistons 17 and 18 when the rotor shaft 26 is further rotated. However, while the hydraulic pressure in the fluid chamber 19 is higher than the hydraulic pressure in the fluid chamber 20, the rotor shaft 26 is applied with a load from the first piston 17. Therefore, the small diameter portion 26c and the bearing 30 will be maintained at the position illustrated in FIG. 4(a). When the hydraulic pressure in the fluid chamber 19 then becomes equal to the hydraulic pressure in the fluid chamber 20, the bearing 30 is rotatably moved in contact with the inner periphery of the second bearing 14 while rotating about the small diameter portion 26c so as to be moved from the position illustrated in FIG. 4(a) to the position illustrated in FIG. 4(b).

When the hydraulic pressure in the fluid chamber 19 becomes lower than the hydraulic pressure in the fluid chamber 20 corresponding to a further rotation of the rotor shaft 26, the rotor shaft 26 is applied with a load in the direction E from the second piston 18 and is deflected in an opposite direction to the deflecting direction in a state where the rotor shaft 26 is applied with the load in the direction D. Therefore, the small diameter portion 26c and the bearing 30 are moved in the same direction to the direction E in which the rotor shaft 26 is applied with the load, i.e. are moved toward the first piston 17 which is not illustrated in FIG. 4 so as to be positioned as illustrated in FIG. 4(c). In this case, the bearing 30 has been pushed by the biasing force of the spring portion 33 in the direction F intersected at right angles with the direction E in which the bearing 30 is moved. Therefore, the bearing 30 is rotatably moved in contact with the inner periphery of the second bearing bore 14 while rotating about the small diameter portion 26c. The bearing 30 is hence moved from the position illustrated in FIG. 4(b) to a position illustrated in FIG. 4(c).

The hydraulic pressure in the fluid chamber 20 is increased corresponding to a further rotation of the rotor shaft 26. However, when the rotor shaft 26 is moved to be positioned at the leftmost side as illustrated by a temporary line in FIG. 1, the hydraulic pressure in the fluid chamber 20 is decreased and the hydraulic pressure in the fluid chamber 19 is increased. However, while the hydraulic pressure in the fluid chamber 20 has been higher than the hydraulic pressure in the fluid chamber 19, the bearing 30 is applied with the load in the direction E from the second piston 18 so as to be maintained at the position illustrated in FIG. 4(c).

When the hydraulic pressure in the fluid chamber 20 becomes lower than the hydraulic pressure in the fluid chamber 19, the rotor shaft 26 is applied with a load in the direction D from the first piston 17. Therefore, the small diameter portion 26c and the bearing 30 are moved in the same direction to the direction D in which the rotor shaft 26 is applied with the load, i.e. are moved toward the second piston 18 which is not illustrated in FIG. 4 so as to be positioned as illustrated in FIG. 4(a). In this case, the bearing 30 has been pushed by the biasing force of the spring portion 33 in the direction F. Therefore, the bearing 30 is rotatably moved in contact with the inner periphery of the second bearing bore 14 while rotating about the small diameter portion 26c. The bearing 30 is hence moved from the position illustrated in FIG. 4(c) to the position illustrated in FIG. 4(a) through the position illustrated in FIG. 4(b).

The hydraulic pressure in each fluid chamber 19 and 20 is then repeatedly changed in response to a further rotation of the rotor shaft 26 so that fluid is repeatedly introduced into each fluid chamber 19 and 20 and discharged threrefrom so as to perform the pump operation. Therefore, the bearing 30 is displaced alternately in the directions D and E in response to the variation of the load applied to the rotor shaft 26 so as to be located at either the position illustrated in FIG. 4(a) or the position illustrated in FIG. 4(c). When the bearing 30 is moved as illustrated in FIG. 4, the bearing 30 is always pushed in contact with any one of the portion of the inner periphery of the second bearing bore 14. That is, the bearing 30 is rotatably moved while rotating the small diameter portion 26c and is always displaced passing the position illustrated in FIG. 4(b).

Following effects can be obtained by the pump 10 according to the first embodiment of the present invention.

According to the first embodiment of the present invention, it is preferable that the spring member 33 can be provided for biasing the bearing 30 to be always in contact with any one of the portions of the inner periphery of the second bearing bore 14. The bearing 30 may be displaced due to a clearance between the bearing 30 and the small diameter portion 26c. However, the bearing 30 is rotatably displeased always in contact with the inner periphery of the second bearing 14 so that the bearing 30 does not collide with the second bearing bore 14. Therefore, noise or vibration due to the collisions can be restrained even when the clearance between the bearing 30 and the small diameter portion 26c is defined due to easy and low-cost assembling methods.

Further, it is preferable that the bearing 30 can be biased by the biasing force of the spring member 33 in the direction F intersected at right angles with the directions D and E in which the bearing 30 is applied with the force by the piston movement of the first and second pistons 17, 18. The biasing force of the spring member 33 is preset almost irrespective of the force to displace the bearing 30. Therefore, the biasing force of the spring member 33 can be small even when the force to displace the bearing 30 in response to the varying road is large. Therefore, the biasing means can be structured and assembled more easily so that noise or vibration can be almost prevented at a low cost.

Further, it is preferable that the base plate 33a of the spring member 33 can be fitted into the groove 14a and the elastic piece 33b thereof biases the bearing 30. Therefore, the easily-structured spring member 33 can be easily disposed in the groove 14a so that noise or vibration can be almost prevented at a low cost.

Further, it is preferable that the spring member 33 can be integrally formed with the wave washer 31 adjacent to the bearing 30 for determining the axial position of the rotor shaft 26. Therefore, the spring member 33 can be easily disposed in the groove 14a by an easy assembling method without adding other components, i.e. without increasing manufacturing processes for assembling.

Further, it is preferable that the wave washer 31 integrally formed with the spring member 33 is employed as the plate portion 32 for determining the axial position of the rotor shaft 26. The plate portion 32 has been conventionally employed as the wave washer for the pump. That is, the spring member 33 (the biasing means) for biasing the bearing 30 can be integrally formed with the plate portion 32 only by adding an easy design modification regarding the conventional wave washer. Therefore, noise or vibration can be decreased at a low cost without increasing assembling processes, Next, the bearing mechanism and the pump according to a second embodiment of the present invention are described below. The bearing mechanism at the bottom portion of the rotational shaft 26 according to the second embodiment is different from the one according to the first embodiment and the other structure according to the second embodiment is the same as the one according to the first embodiment. Therefore, the bearing mechanism at the bottom portion of the rotational shaft 26 according to the second embodiment is described with reference to FIGS. 5, 6, 7. Identical elements according to the second embodiment to the ones according to the first embodiment are denoted with the identical reference numerals.

Figure 5:
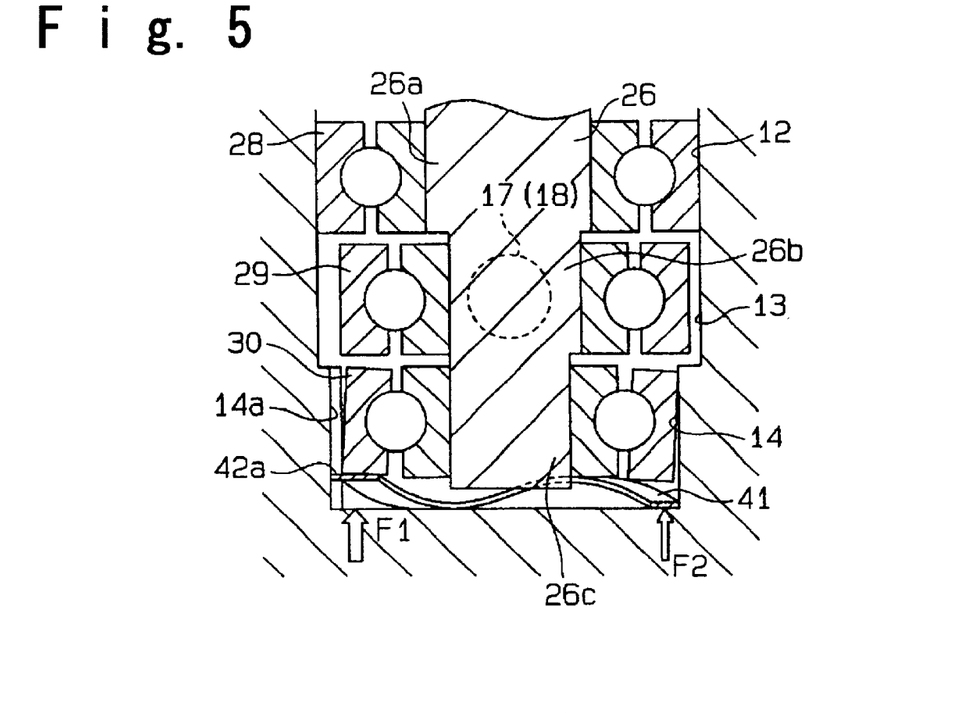
FIG. 5 is a plan cross-sectional view of a relevant portion of a pump according a second embodiment.

Referring to FIG. 5, a bottom surface of the outer race of the bearing 30 supporting the small diameter portion 26c of the rotational shaft 26 is supported by a wave washer 41 (the biasing means and the position detecting means) disposed at the bottom portion of the second bearing bore 14. The wave washer 41 is provided with a plate portion 42 in a ring shaped structure with a wavy cross-section. The plate portion 42 limits the axial movement of the rotational shaft 26 by axially biasing the bearing 30.

Figure 6:
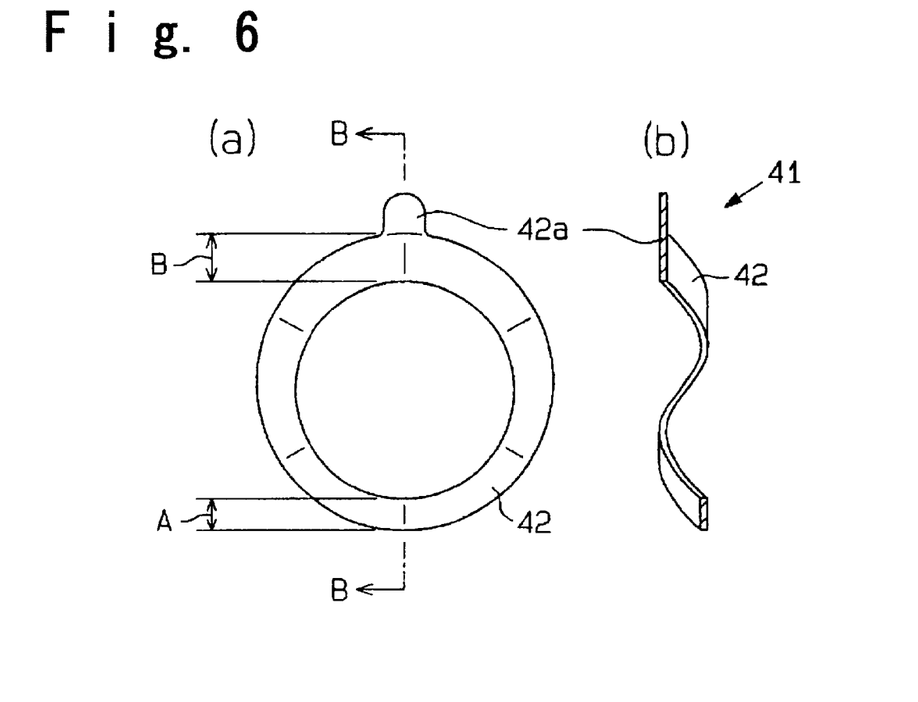
FIG. 6 is a plan view illustrating a wave washer according to the second embodiment.

As illustrated in FIG. 6, the plate portion 42 of the wave washer 41 has a different radial width in a circumferential direction thereof. More specifically, the plate portion 42 is provided with a plate width A to be a minimum width thereof and a plate width B to be a maximum width thereof. The plate width A and the plate width B are arranged at axially opposite positions of the plate portion 42 in a predetermined radial direction thereof and are opposed to each other. The plate width A is illustrated in a lower side of the plate portion 42 in FIG. 6 and the plate width B is illustrated in an upper side thereof in FIG. 6. The plate width of the plate portion 42 is gradually increased in a direction from the plate width A to the plate width B and is gradually decreased in the other direction from the plate width B to the plate width A. Therefore, a load axially applied to the bearing 30 corresponding to an axially biasing force of the wave washer 41 is set to be an offset load. That is, a different load will be applied to the bearing 30 in a circumferential direction of the bearing 30. The plate width B is provided with a projection 42a (engaging means) projected in the radial direction of the plate portion 42 at a portion of the plate width B having the maximum width. The projection 42a is engaged with the groove 14a axially defined in the inner peripheral surface of the second bearing bore 14 for determining a position of the wave washer 41 in a circumferential direction thereof.

As described above, the bearing 30 is axially applied with the offset load by the wave washer 41 so as to be inclined within a range of the clearance between the bearing 30 and the second bearing bore 14. The bearing 30 is hence accommodated in the second bearing bore 14 with an axial direction inclined relative to the axial direction of the second bearing bore 14. Therefore, a partial portion of an upper edge portion of the outer race of the bearing 30 is pushed to the inner peripheral wall of the second bearing bore 14 and becomes in contact therewith. A partial portion of a lower edge portion of the outer race of the bearing 30 being arranged at an axially opposite side thereof is also pushed to the inner peripheral wall of the second bearing bore 14 and becomes in contact therewith. The radial movement of the bearing 30 in the second bearing bore 14 is hence restricted by the inclination of the bearing 30. Therefore, the bearing 30 is prevented from the collisions with the second bearing bore 14 even when the varying load in response to the slidable movement of the first and second pistons 17, 18 are applied to the rotational shaft 26. Therefore, noise or vibration due to the collisions is prevented.

Figure 7:
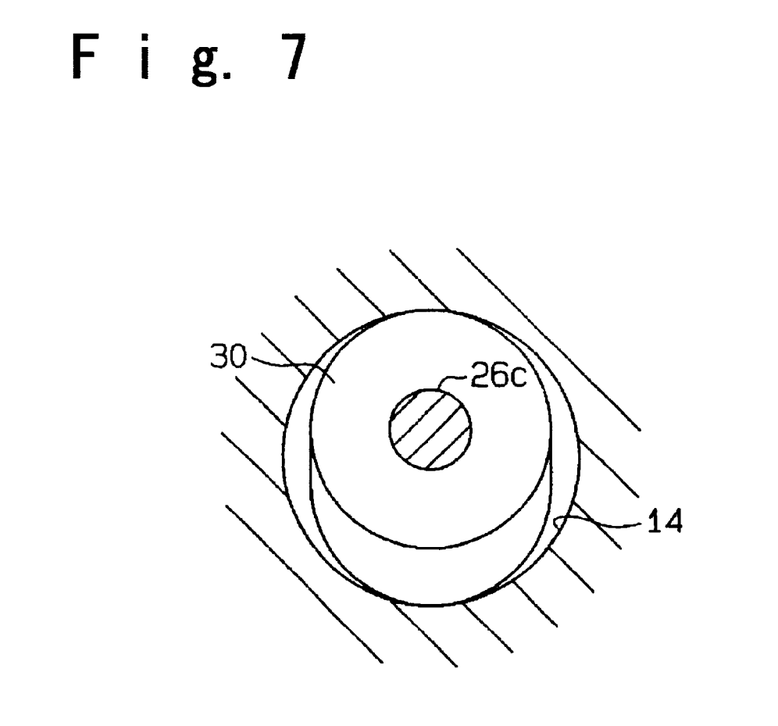
FIG. 7 is a principle view illustrating a pump operation according to the second embodiment.

The groove 14a is defined in a direction intersected at right angles with the directions in which the piston accommodating bores 15, 16 extend. The bearing 30 is applied with an approximately maximum value F1 of the offset load and an approximately minimum value F2 thereof. The approximately maximum value F1 and the approximately minimum value F2 are respectively supported by a side of the bearing 30 in the radial direction intersected approximately at right angles with the directions D and E and by the other side thereof. The offset load applied to the bearing 30 is distributed in a predetermined manner in the circumferential direction thereof. As illustrated in FIG. 7, the contacting portions of the bearing 30 due to the inclination thereof relative to the internal peripheral wall of the second bearing bore 14 are held by the one side of the bearing 30 in the radial direction intersected approximately at right angles with the directions D and E and the other side thereof so as to restrain the movement of the bearing 30. That is, the inclining direction of the bearing 30 is maintained in a direction for easily restraining the displacement of the bearing 30 due to the varying load applied to the rotational shaft 26 so as to assure the restriction of the movement of the bearing 30.

As described above, according to the second embodiment of the present invention, noise or vibration due to the collisions of the bearing 30 can be restrained at a low cost without adding other components.

The first embodiment of the present invention can be modified as follow.

Figure 8:
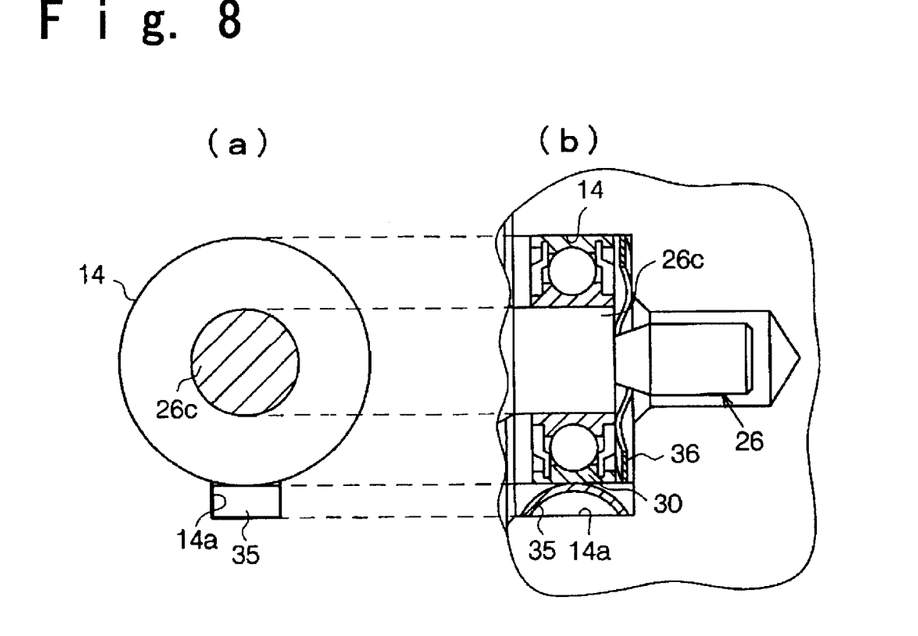
FIG. 8 is a sectional view illustrating a relevant portion of a pump including a biasing means according to a first modified example of the first embodiment, in which (a) is a plan sectional view thereof and (b) is a cross-sectional view thereof.

Referring to FIG. 8, a metal piece 35 made of a square plate in an approximately U shaped structure can be employed as the biasing means in substitution for the spring member 33 of the wave washer 31 according to the first embodiment. In this case, it is preferable that a conventional wave washer 36 is provided for the rotor shaft 26.

Figure 9:
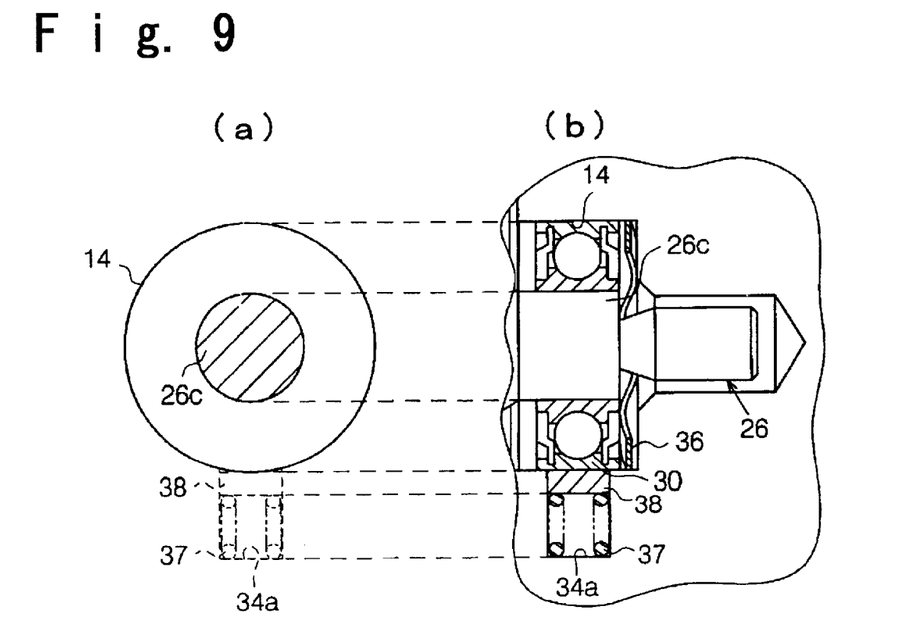
FIG. 9 is a sectional view similar to FIG. 8 according to a second modified example of the first embodiment, in which (a) is a top sectional view thereof and (b) is a cross-sectional view thereof.

Referring to FIG. 9, a groove 34a being radially longer than the groove 14a is defined in the inner peripheral wall of the second bearing bore 14. A spring 37 and a piston 38 are disposed as the biasing means in the groove 34a in substitution for the spring member 33 of the wave washer 31 according to the first embodiment. The bearing 30 is pushed by the piston 38 assisted by a biasing force of the spring 37.

Further, according to the first embodiment, the spring member 33 of the wave washer 31 can be separated from the plate portion 32 so that the spring member 33 as the biasing means is disposed in the groove 14a independent of the wave washer 36.

Further, the spring member 33 as the biasing means according to the first embodiment can be other springs including conventional springs, a coned disc spring, and a volute spring.

Further, fluid pressure can be employed as the biasing means in substitution for the spring member 33 of the wave washer 31 according to the first embodiment.

According to the first embodiment of the present invention, the spring member 33 as the biasing means is integrally formed with the wave washer 31. However, the biasing means can be provided for a spacer adjacent to the bearing 30 for determining the axial position of the bearing 30. In this case, the biasing means can be provided by easy assembling methods without adding manufacturing processes for assembling.

The second embodiment of the present invention can be modified as follow.

Figure 10:
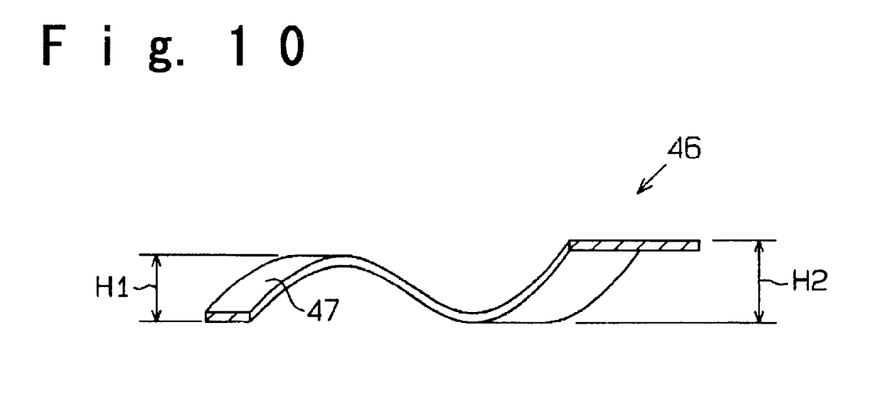
FIG. 10 is a cross-sectional view illustrating a first modified example of a biasing means according to the second embodiment.

According to the second embodiment, the wave washer 41 is provided with the plate portion 42 which has the different radial width in the circumferential direction. Therefore, the load axially applied to the bearing 30 is set to be the offset load. However, as illustrated in FIG. 10, a wave washer 46 can be employed in substitution for the wave washer 41 according to the second embodiment. The wave washer 46 is provided with a plate portion 47 which has a different axial height in a circumferential direction. Therefore, a load axially applied to the bearing 30 from the plate portion 47 is set to be an offset load. More specifically, the plate portion 47 is provided with a height H1 to be a minimum height of the plate portion 47 and a height H2 to be a maximum height thereof which both are arranged at axially opposite portions of the plate portion 47 and are opposed each other. The height H1 is illustrated at a left side in FIG. 10 and the height H2 is illustrated at a right side in FIG. 10. A portion connecting the height H1 and the height H2 have a wavy cross-section. Therefore, the bearing mechanism modified as described above can yield the same effects as the effects yielded by the bearing mechanism according to the second embodiment.

Figure 11:
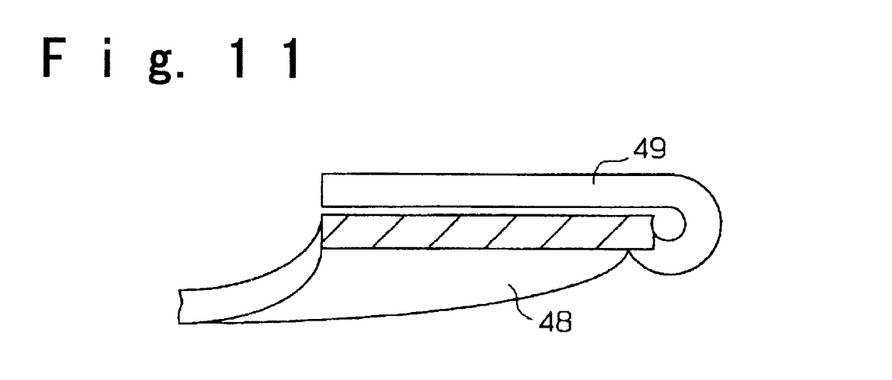
FIG. 11 is a cross-sectional view illustrating a second modified example of the biasing means according to the second embodiment.

As illustrated in FIG. 11, a common wave washer 48 can be employed in substitution for the wave washer 41 according to the second embodiment. The wave washer 48 is provided with a projection outwardly projected at a predetermined radial direction of the wave washer 48. The projection is bent inwardly so as to define a clinched portion 49 for increasing elastic coefficient value of the inwardly bent portion of the wave washer 48. Therefore, a load axially applied to the bearing 30 from the wave washer 48 is set to be an offset load. The clinched portion 49 can be defined by bending a projection inwardly projected in the radial direction in an outer direction. Alternatively, the wave washer 48 can be connected with a plate piece at a predetermined position in the radial direction for setting the load axially applied to the bearing 30 from the wave washer 48 as the offset load. Therefore, the bearing mechanism modified as described above can yield the same effects as the ones yielded by the bearing mechanism according to the second embodiment.

Figure 12:
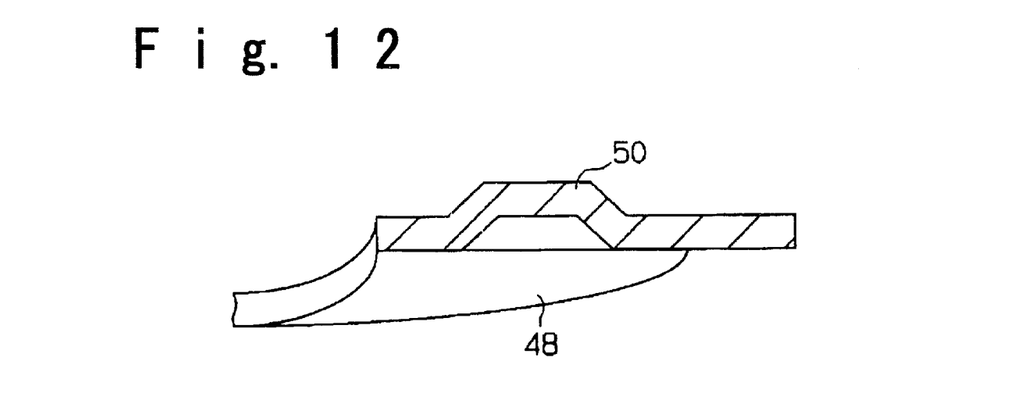
FIG. 12 is a cross-sectional view illustrating a third modified example of the biasing means according to the second embodiment.

As illustrated in FIG. 12, the wave washer 48 can be provided with a rib 50 fixed at a predetermined position in the radial direction and lifted up in an axial direction thereof so that the elastic coefficient value of the lifted-up portion of the wave washer 48 is increased. Therefore, a load axially applied to the bearing 30 in response to the biasing force of the wave washer 48 is set to be an offset load. Therefore, the bearing mechanism modified as described above can yield the same effects as the ones yielded by the bearing mechanism according to the second embodiment.

Figure 13:
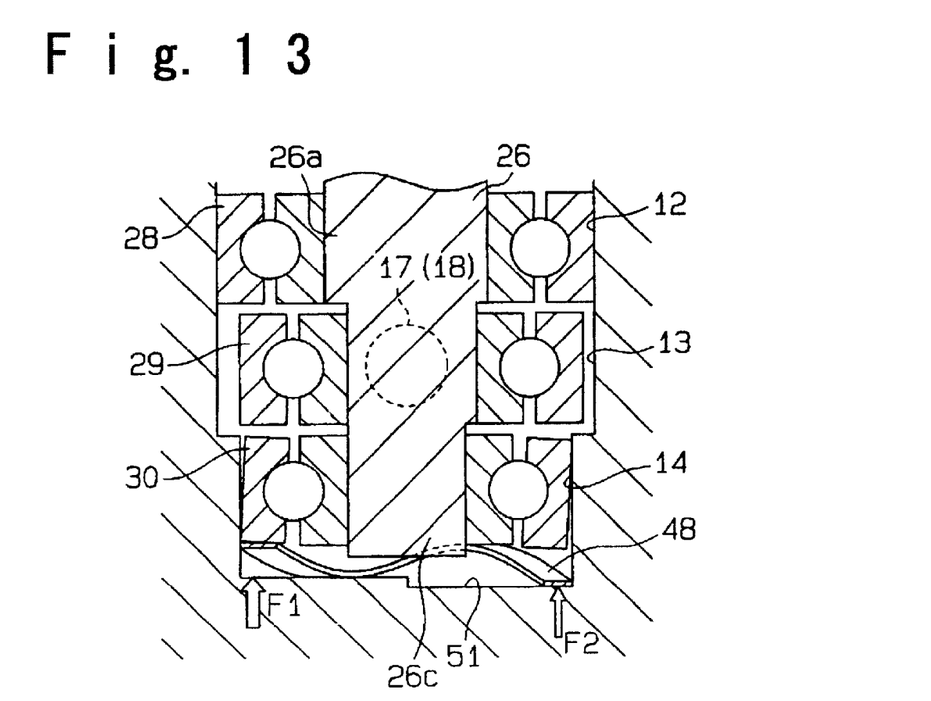
FIG. 13 is a cross-sectional view illustrating a relevant portion of a pump provided with a fourth modified example of the biasing means according to the second embodiment.

As illustrated in FIG. 13, a different axial height in a circumferential direction can be provided with a bottom portion 51 axially applied with load from the wave washer 48 so as to change an elastically deforming amount of the wave washer 48. Therefore, a different load is axially applied to the bearing 30 and can be set as an offset load. Therefore, the bearing mechanism modified as described above can yield the same effects as the ones yielded by the bearing mechanism according to the second embodiment.

According to the second embodiment, a wave shaped spring is employed as the biasing means. However, a coned disc spring can be employed in substitution for the wave shaped spring according to the second embodiment.

According to the first and second embodiments, the biasing means is provided for the bearing 30 supporting the rotational shaft 26 being applied with the varying load. However, the biasing means can be also provided for the bearings 27 and 28 in the same manner as being provided for the bearing 30.

Further, according to the first and second embodiments, the rotational shaft 26 is supported at both upper portion and lower portion by the bearings 27 and 30, respectively. However, the rotational shaft 26 can be supported only at the upper portion by the bearing 27 without being supported at the lower portion by the bearing 30. In this case, the biasing means can be provided for the bearings 27 and 28 as well in the same manner as being provided for the bearing 30.

Further, according to the first and second embodiments, the bearings support the rotational shaft 26 being applied with the varying load from the first and second pistons 17, 18 positioned substantially on the same straight line. However, the bearings can support the rotational shaft 26 being applied with the varying load in various directions. For example, the rotor shaft 26 can be operatively connected three pistons around the rotational shaft 26 at intervals of 120-degree.

Further, according to the first and second embodiments, the bearing mechanism is applied for the pump 10. However, the bearing mechanism can be applied for other devices having the bearing applied with the varying load.

The principles, preferred embodiment and mode of operation of the present invention have been described in the foregoing specification. However, the invention which is intended to be protected is not to be construed as limited to the particular embodiment disclosed. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What we claim is:

1. A bearing mechanism comprising:

a shaft subjected to a varying load;

a bearing accommodated in a cylindrical bearing accommodating portion for supporting the shaft;

biasing means for biasing the bearing to be always in contact with at least a portion of an inner peripheral surface of the cylindrical bearing accommodating portion in a first direction different from a second direction in which the bearing is displaced in accordance with the varying load; and the biasing means being integrally formed with a position determining means for determining a position of the shaft;

wherein the position determining means includes a wave washer provided with an approximately ring shaped plate portion with a wave shape in a cross-section thereof and a projecting portion projecting from the approximately ring shaped plate portion for generating a biasing force toward an axial center of the approximately ring shaped plate portion.

2. A bearing mechanism according to claim 1, wherein the projecting portion includes a base plate and an elastic piece.

3. A bearing mechanism comprising:

a shaft subjected to a varying load;

a bearing accommodated in a cylindrical bearing accommodating portion for supporting the shaft;

biasing means for biasing the bearing to be always in contact with at least a portion of an inner peripheral surface of the cylindrical bearing accommodating portion in a first direction different from a second direction in which the bearing is displaced in accordance with the varying load; and the biasing means being integrally formed with a position determining means for determining a position of the shaft;

wherein the biasing means includes a metal piece made of a square plate inserted in the cylindrical bearing accommodating portion and having a bent portion for biasing the bearing toward an axial center thereof.

4. A bearing mechanism comprising:

a shaft subjected to a varying load;

a bearing accommodated in a cylindrical bearing accommodating portion for supporting the shaft;

biasing means for biasing the bearing to be always in contact with at least a portion of an inner peripheral surface of the cylindrical bearing accommodating portion in a first direction different from a second direction in which the bearing is displaced in accordance with the varying load;

the biasing means applying different load to the bearing in a circumferential direction thereof so as to bias the bearing in an axial direction thereof; and the biasing means including a position determining means biasing the bearing in the axial direction for determining an axial position of the shaft via the bearing;

wherein the position determining means is provided with a maximum plate width and a minimum plate width for applying the different load to the bearing in the circumferential direction thereof so as to bias the bearing in the axial direction thereof.

5. A bearing mechanism according to claim 4, wherein the shaft is subjected to the varying load in two directions opposite to each other, and the biasing means biases the bearing in a first direction which forms approximately a right angle with a second direction in which the bearing is displaced in accordance with the varying load.

6. A bearing mechanism comprising:

a shaft subjected to a varying load;

a bearing accommodated in a cylindrical bearing accommodating portion for supporting the shaft;

biasing means for biasing the bearing to be always in contact with at least a portion of an inner peripheral surface of the cylindrical bearing accommodating portion in a first direction different from a second direction in which the bearing is displaced in accordance with the varying load;

the biasing means applying different load to the bearing in a circumferential direction thereof so as to bias the bearing in an axial direction thereof, and the biasing means including a bottom portion of a bearing bore with an uneven axial height in a circumferential direction for applying the different load to the bearing in the circumferential direction thereof so as to bias the bearing in the axial direction.

7. A bearing mechanism comprising:

a shaft subjected to a varying load;

a bearing accommodated in a cylindrical bearing accommodating portion for supporting the shaft;

biasing means for biasing the bearing to be always in contact with at least a portion of an inner peripheral surface of the cylindrical bearing accommodating portion in a first direction different from a second direction in which the bearing is displaced in accordance with the varying load;

the biasing means applying different load to the bearing in a circumferential direction thereof so as to bias the bearing in an axial direction thereof; and the biasing means including a position determining means biasing the bearing in the axial direction for determining an axial position of the shaft via the bearing;

wherein the position determining means is provided with a first portion for applying a maximum load to the bearing in the circumferential direction thereof so as to bias the bearing in the axial direction thereof.

8. A bearing mechanism according to claim 7, wherein the shaft is subjected to the varying load in two directions opposite to each other, and the biasing means biases the bearing in a first direction which forms approximately a right angle with a second direction in which the bearing is displaced in accordance with the varying load.

9. A pump provided with a bearing mechanism comprising:

a rotor shaft having an eccentric portion rotated by an electric motor;

a pair of pistons operatively connected to the eccentric portion and reciprocated by an eccentric movement of the eccentric portion;

a bearing accommodated in a cylindrical bearing accommodating portion for supporting the shaft;

biasing means for biasing the bearing to be always in contact with at least a portion of an inner peripheral surface of the cylindrical bearing accommodating portion in a first direction different from a second direction in which the bearing is displaced in accordance with the varying load;

the biasing means applying different load to the bearing in a circumferential direction thereof so as to bias the bearing in an axial direction thereof; and the biasing means including a position determining means biasing the bearing in the axial direction for determining an axial position of the shaft via the bearing;

wherein the position determining means is provided with a first portion for applying a maximum load to the bearing and a second portion for applying a minimum load to the bearing in the circumferential direction thereof so as to bias the bearing in the axial direction thereof.

10. A pump provided with a bearing mechanism comprising:

a rotor shaft having an eccentric portion rotated by an electric motor;

a pair of pistons operatively connected to the eccentric portion and reciprocated by an eccentric movement of the eccentric portion;

a bearing accommodated in a cylindrical bearing accommodating portion for supporting the shaft;

biasing means for biasing the bearing to be always in contact with at least a portion of an inner peripheral surface of the cylindrical bearing accommodating portion in a first direction different from a second direction in which the bearing is displaced in accordance with the varying load;

the biasing means applying different load to the bearing in a circumferential direction thereof so as to bias the bearing in an axial direction thereof;

the biasing means including a position determining means biasing the bearing in the axial direction for determining an axial position of the shaft via the bearing;

wherein the position determining means is provided with a maximum plate width and a minimum plate width for applying the different load to the bearing in the circumferential direction thereof so as to bias the bearing in the axial direction thereof.

* * * * *

UNITED STATES PATENT AND TRADEMARK OFFICE
CERTIFICATE OF CORRECTION

PATENT NO. : 6,779,990 B2
DATED : August 24, 2004
INVENTOR(S) : Yasuhito Sekihara et al.

It is certified that error appears in the above-identified patent and that said Letters Patent is hereby corrected as shown below:

Title page,
Item [54], Title, change "BEARING MECHANISM AND A PUMP" to -- PUMP SHAFT BEARING MECHANISM AND PUMP --.

Signed and Sealed this

Twenty-second Day of March, 2005

JON W. DUDAS
*Director of the United States Patent and Trademark Office*